United States Patent [19]

Van Solt

[11] Patent Number: 5,397,882
[45] Date of Patent: Mar. 14, 1995

[54] METHOD FOR SPOT CHECKING A CLIENT IN A SELF-SERVICE STORE

[75] Inventor: Ronald J. Van Solt, GM Edam, Netherlands

[73] Assignee: Ahold Retail Services AG, Klosters, Switzerland

[21] Appl. No.: 63,581

[22] Filed: May 14, 1993

[51] Int. Cl.⁶ .................... G07F 17/14; G07C 15/00
[52] U.S. Cl. ........................................ 235/381; 235/383
[58] Field of Search ............... 235/383, 380, 376, 381; 186/52, 59

[56] References Cited

U.S. PATENT DOCUMENTS

| | | |
|---|---|---|
| 3,749,191 | 7/1973 | Ashen et al. . |
| 3,836,755 | 9/1974 | Ehrat . |
| 3,878,365 | 4/1975 | Schwartz ........................ 235/385 X |
| 4,157,738 | 6/1979 | Nishiguchi et al. . |
| 4,180,204 | 12/1979 | Koenig et al. . |
| 4,373,133 | 2/1983 | Clyne et al. . |
| 5,013,896 | 5/1991 | Ono et al. ........................... 235/381 |

FOREIGN PATENT DOCUMENTS

| | | |
|---|---|---|
| 0003557 | 8/1979 | European Pat. Off. . |
| 0086059 | 8/1983 | European Pat. Off. . |
| 0390448 | 10/1990 | European Pat. Off. . |
| 8800907 | 11/1989 | Netherlands . |
| 1267630 | 3/1972 | United Kingdom . |
| 2064184 | 6/1981 | United Kingdom . |
| 2068132 | 8/1981 | United Kingdom . |
| 2117709 | 10/1983 | United Kingdom . |
| 2178576 | 2/1987 | United Kingdom . |
| WO89/06406 | 7/1989 | WIPO . |

*Primary Examiner*—Davis L. Willis
*Assistant Examiner*—Edward H. Sikorski
*Attorney, Agent, or Firm*—Pennie & Edmonds

[57] ABSTRACT

A customer pass or card registered in the client's name is issued to each client who wishes to make use of the self-registration system. A check parameter, such as an integer, is assigned to the customer pass, and is either recorded in the customer pass or stored in the memory of a computer. After the client has registered the selected articles using a portable scanning device, the scanner is coupled to a readout station and at the same time the identity of the client and the associated check parameter are determined. With the aid of an automatic device, such as a random number generator, it is determined whether a spot check should take place. The store arrangement includes shelves 3, typical cash desks 4, and a check selection station 22 where a client wishing to make use of the self-registration system presents the customer pass. Station 22 determines whether the client must be spot checked. If a spot check is needed, the client is directed to a check cash desk 24 where a storeworker registers the articles in the normal manner. If no spot check is needed, the client can go directly to the readout station 6 where the portable scanner is read out automatically.

35 Claims, 1 Drawing Sheet

METHOD FOR SPOT CHECKING A CLIENT IN A SELF-SERVICE STORE

FIELD OF THE INVENTION

This invention relates to a method for checking articles registered with a scanner by a client himself in a self-service store.

BACKGROUND OF THE INVENTION

Well known are self-service stores where clients themselves, by means of a scanning device, scan a code of each article selected for purchase and register same in the memory of the scanning device. At the exit of the store, the memory of the scanning device is then coupled to a readout device, which reads the codes registered by the client and subsequently produces a receipt. Thus, long waiting times at the cash points are avoided.

Such stores are for instance described in British patent application 2068132 and in Dutch patent application 8800907.

A problem presenting itself in the known stores is the implementation of an efficient check of the correctness of the registration. According to British patent application 2068132, a check of the correctness of the registration has been made possible by incorporating information about the weight of each article into the code thereof, so that the total weight of all the selected articles can be calculated after the codes thereof have been read out.

Further, a weighing device is present, which weighs the articles when still disposed in a trolley. The weight indicated by the weighing device can subsequently be compared with the total weight calculated.

A disadvantage of this checking method is that it requires special weighing devices which are relatively sizeable and costly. Moreover, such a weight check does not permit a distinction to be made between articles of the same weight but different prices.

According to Dutch patent application 8800907, the number of articles is checked by means of a light barrier above the box of the trolley. Further, in a lock, the codes of a number of articles still disposed in the trolley are optically read and it is checked whether these codes have in fact been registered correctly.

This checking method, too, is rather laborious and requires large investments in trolleys equipped with vulnerable light barriers and locks in which the trolleys can be placed in order to check a number of codes.

SUMMARY OF THE INVENTION

The object of the present invention is to provide a simpler and yet efficient method for checking articles selected and registered for payment by a client. To realize this object, in accordance with the present invention, in a method of the above-described type, a customer pass registered in the client's name is issued to each client who wishes to make use of the self-registration system; a check parameter is assigned to the customer pass; after the client has registered the selected articles, the scanner is coupled to a readout station and at the same time the identity of the client and the associated check parameter are determined by means of the customer pass; and with the aid of an automatic device it is determined, starting from the check parameter, whether a check should take place.

In accordance with the present invention, a store arrangement suitable for practicing the present method comprises a readout station for reading out the articles registered with a scanner; a device for recognizing a customer pass and means for automatically determining an associated check parameter, whilst further an automatically operating device is provided, which, depending on the check parameter determined, generates a signal indicating whether a check should take place.

DESCRIPTION OF THE DRAWINGS

Hereinafter the present invention will be further described with reference to the accompanying drawings.

DESCRIPTION OF THE INVENTION

Figure 1:
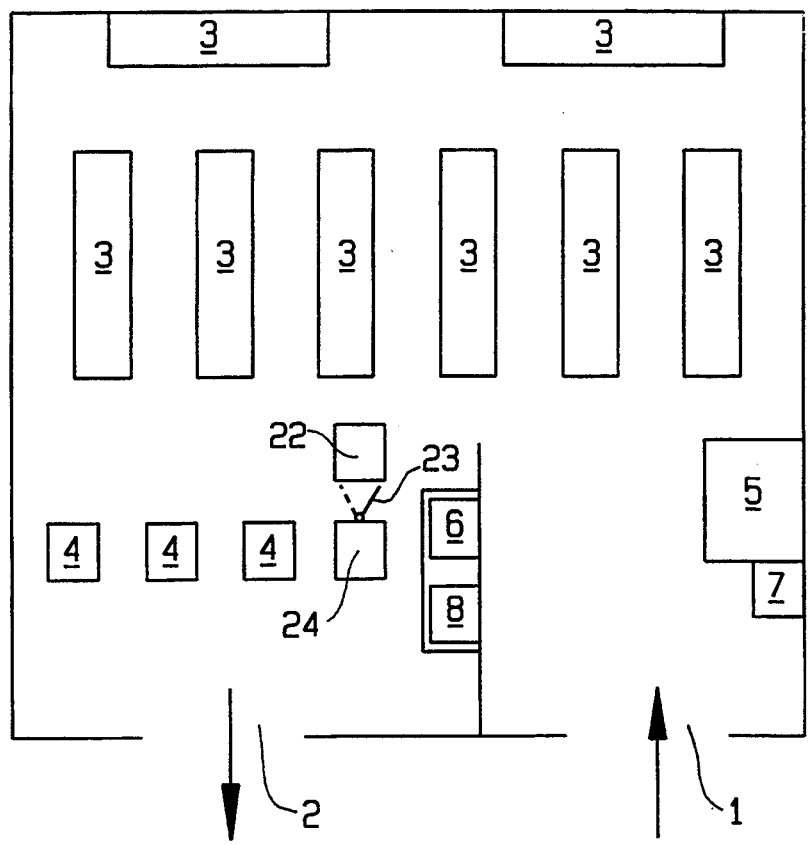
FIG. 1 schematically shows an example of a store arrangement suitable for practicing the invention.

FIG. 1 is a schematic map of an example of a self-service store. The store has an entrance 1 and an exit 2. Outside the store, for instance at a parking lot or in a hall of the store, a trolley can be obtained which can be run along the shelves 3 in the store to select the desired articles from the available assortment and to load them into the trolley. Finally, the articles can be paid for at one of the cash points in a cash desk section 4.

According to the present invention, the store is further equipped with a dispensing station for portable scanning devices. The dispensing station is shown schematically at 5. The client who wishes to enter the display space of the store must first pass the dispensing station 5, where, upon presenting a customer pass, he receives a portable scanning device which he carries along into the store.

Each client who wishes to make use of the self-registration system must possess a customer pass issued in his or her name, which may for instance be in the form of a credit card or a conventional bank pass. The customer pass can be checked visually but is preferably encoded electronically and/or magnetically, which makes automatic identification possible. After a client has entered the store and the pass he presents has been recognized, a portable scanning device is released, preferably automatically, which the customer can carry along into the store. If so desired, it can be registered at the same time which scanning device has been taken along by the client identified through the customer pass. The dispensing station preferably comprises a reading device capable of automatically reading and recognizing an electronic and/or magnetic and/or other code of the pass.

It is possible that the customer pass is no longer valid or is not suitable for the self-registration system. In that case, no scanning device is released and the client must do his shopping in the usual manner. The same applies to clients who do not have a customer pass.

The scanning devices comprise at least a scanning head, which can be brought close to a code provided on the articles with the hand, so that the code can be read, and further a memory for storing the codes read.

Since merchandise items are frequently encoded by means of bar codes, the scanning head will have to be an optical scanner in a practical situation. In principle, however, all other types of codes, such as magnetic codes or binary codes stored in a chip, can be used as well, along with an associated scanning device which can detect the codes used and store them in a memory.

Figure 2:
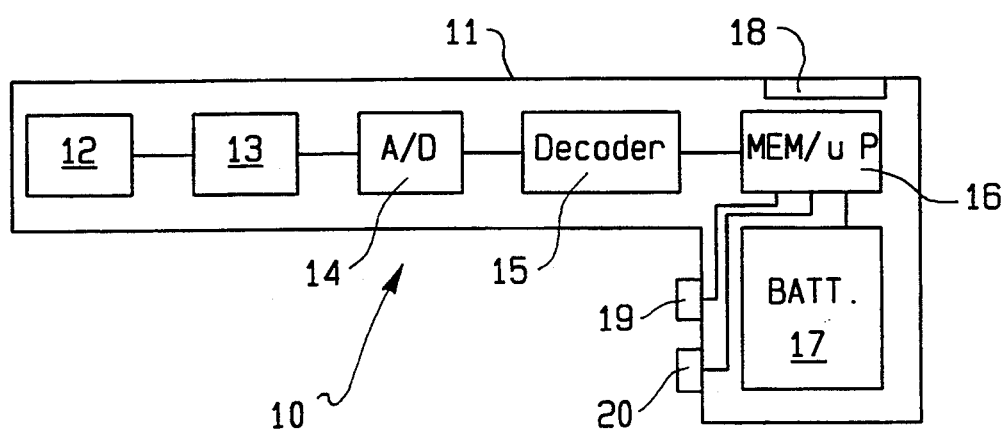
FIG. 2 schematically illustrates the set-up of a scanning device for use in a method according to the present invention.

FIG. 2 schematically shows, by way of example, the set-up of an optical scanner which can be used in the self-registration system according to the invention. The scanner may for instance have the shape of a pistol or the shape of an electric razor or any other shape easily held in the hand. The housing of the scanner 10 is schematically indicated at 11 and contains an optical part 12; a device 13 capable of converting incident light into electric signals, for instance a CCD array; an analog-digital converter 14, which converts the electric signals of the device 13 into binary signals; a decoding device 15, which can decode the article code scanned and converted into binary signals, and can feed it to a memory device 16. The memory device 16 can comprise a microprocessor, which can, for instance, calculate the total price of the selected articles, taking into account any discounts, promotional prices and the like. The scanner may further comprise a LCD screen 18 for displaying the type and the price of the article whose code has been scanned or the total price of the selected articles and the like.

Further, an 'enter' button 19 and an 'erase' button 20 may be provided for actually storing scanned codes in the memory device or erasing them therefrom when the article in question is put back.

The scanner further comprises a, preferably rechargeable, battery 17, which is charged when the scanner is in the dispensing station, in the same manner as with the known wireless electric tools.

The dispensing station preferably comprises a casing with a plurality of holders for scanners. When a scanner is disposed in a holder, the battery or accumulator of the scanner is coupled with a charging device indicated separately at 7.

According to the invention, during shopping the client scans the code provided on each article selected for purchase and subsequently puts the article in the trolley.

Accordingly, when the client has gathered all desired articles in this manner and has scanned the codes thereof, all articles disposed in the trolley are already registered in the memory of the mobile scanning device.

The cash desk section now comprises at least one readout station 6 which can be coupled to a scanner via a suitable connector. The readout station automatically reads the information stored in the memory of the scanner and prints a receipt, after a random check, if applicable. Then the client only needs to pay and remove the articles.

Thus, the separate manipulation and registration of each article no longer occurs at the cash points. Accordingly, the final transaction at the cash desk 4 or the readout station can occur considerably faster than heretofore.

The usual actions performed at the cash desk 4 are necessary only for clients who do not use the self-registration system or in the case of a random check, if applicable.

Whether, in a given situation, a random check is carried out or not is determined, in accordance with the invention, by an automatically operating device. This may for instance be a computer 8, which is part of or connected to the readout station.

A check parameter is assigned to each client who makes use of the self-registration system for the first time. According to an exemplary embodiment, this parameter may be an integer, for instance the integer 3. The parameter is preferably written magnetically or electronically in the customer pass, but may also be stored in the memory of the computer with the name of the client. In the latter case, the customer pass need not be of the (re)codable kind.

When the client presents the registered articles and the scanner at the readout station, the scanner is coupled with the readout device and at the same time the customer pass is identified, preferably automatically but not necessarily so. At the same time, the check parameter is determined. The parameter is either read directly from the pass by the readout device or provided by the memory of the computer.

If the check parameter is 3, for instance, an integer less than 3 is determined, i.e., 0, 1 or 2, by means of the automatic device, such as for instance a random generator. If the integer thus determined has a predetermined fixed value, for instance 1, a signal is generated which indicates that a check should be carried out. The chances that a client having parameter 3 is checked are therefore $\frac{1}{3}$.

The number to be determined may also be less than or equal to the check parameter. If the number 0 is not taken into account, this gives the same result.

In a check procedure, each article is registered at the cash desk in the usual manner or it is scanned by a storeworker using a scanning device connected to the cash register. The receipt can be produced by the cash register or by the readout station. In any case, only one receipt is produced. However, the cash register is connected to the computer.

In a practical situation, advantageous use can be made of a check selection station which precedes the readout station. A client who has made use of the self-registration system and subsequently wishes to leave the store must pass the check selection station. Such a check selection station is shown schematically at 22 in FIG. 1 and is adapted to identify a customer pass and, starting from the check parameter associated with an identified pass, to determine whether the client in question must be checked or not. If the check parameter is provided electronically or magnetically on the pass itself, the check selection station may be provided with a random generator which, starting from the value of the check parameter read by the check selection station, generates a number and subsequently produces a signal indicating whether the client in question should be checked or not.

It is also possible, however, that the check selection station only contains a readout device for customer passes and for the rest is coupled to a computer which processes the information read, retrieves the check parameter associated with the presented pass from the computer memory and finally provides a signal indicating whether the client in question must be checked at that time.

The check selection station is preferably so designed that a client who has presented his customer pass cannot walk back into the store anymore. For that purpose, a gate or turnstile 23 turning only to one side can be used.

Further, the check station is so designed that the client, if a check is to be carried out, is guided to the readout station via a check cash desk 24. If no check needs to be carried out, the client can go directly to the readout station and have the scanner read out automatically there, optionally under simultaneous presentation of the customer pass.

The check cash desk 24 is connected to the readout station or to the computer which is part of the readout station or is connected thereto. At the check cash desk, a storeworker just registers the articles selected by the client in the normal manner, but the receipt is not made in the readout station until the client has had the scanning device read out. In the case where the client is checked in this manner, it is moreover necessary that the customer pass be identified by the readout station as well, in order to change the check parameter, if necessary. If the registration of the check cash desk and the registration of the scanner differ, optionally a message is printed on the receipt.

In order to indicate at the check selection station whether the client must go to the check cash desk or can go directly to the readout station, one or more automatically operable swing gates or turnstiles can be used, as schematically indicated at 23.

A check cash desk is preferably used only for checks, but may optionally be adapted to be used both for checks and for the normal checkout operations.

If the client has made a mistake when registering the articles, this cannot be observed by the cashiers. In the computer the result of the registration via the scanner is compared with the result of the check. If a difference is established, this can lead to a change of the check parameter. When in random checks a discrepancy has been established one or more times with the same client, the check parameter may be lowered from 3 to 2. The new parameter is stored in the computer memory and/or on the customer pass.

If a client with a check parameter equal to 2 presents at the readout station, a number less than 2 is generated with the random generator. The chances of the generated number being equal to a predetermined number, for instance 1 or 0, is now ½.

Accordingly, the chances that a client with a parameter equal to 7 is checked are 1/7, whereas a client having a parameter equal to 1 is always checked. After a number of checks, such a client can be requested to have the selected articles registered at the cash desk again in the usual manner.

If, on the other hand, a client appears not to make any mistakes during self-registration, the parameter of that client can be raised, so that the probability of a check is lowered.

It is observed that after the foregoing, various modifications will readily occur to a person of ordinary skill in the art. It has already been mentioned that the customer card can be an electronically or magnetically encoded card. However, the card may also be an optically but invisibly encoded card. The card is preferably so designed that at least a part of the information stored in the card can be modified by the readout station. Such cards are known per se and commercially available.

The customer card may also have a payment function, permitting automatic payment by means of the customer card. The customer card may further be coupled to a secret PIN code which must be entered before a scanner is dispensed.

Further, the computer may or may not be arranged at the location of the readout station. The random generator can be formed by the computer but may optionally be a separate device. Also, the check parameter can be determined or modified in a different manner than in the manner described in the foregoing. Use could for instance be made of a self-learning system.

These and similar modifications are understood to fall within the scope of the invention.

What is claimed is:

1. A method for checking articles registered with a scanner by a client himself in a self-service store, wherein a customer pass registered in the client's name is issued to each client who wishes to make use of the self-registration system; a check parameter is assigned to the customer pass; after the client has registered the selected articles, the scanner is coupled to a readout station and at the same time the identity of the client and the associated check parameter are determined by means of the customer pass; and with the aid of an automatic device it is determined, starting from the check parameter, whether a check should take place.

2. A method according to claim 1, wherein the check parameter is an integer; with the aid of the automatic device a random integer not greater than the check parameter is generated; and a check is carried out if the generated number is equal to a predetermined number.

3. A method according to claim 2, wherein the check is carried out by a cash desk storeworker, who manually registers the selected articles, the result of this registration being compared in the readout unit with the result of the registration with the scanner, without the result of that comparison becoming observable by the cash desk storeworkers, and finally one single receipt is produced.

4. A method according to claim 3, wherein the check parameter is modified depending on the result of one or more checks.

5. A method according to claim 4, wherein a scanner is supplied to a client after identification through a customer pass.

6. A method according to claim 5, wherein the customer pass is a contactlessly readable card.

7. A method according to claim 6, wherein the information stored in the card is at least partly modifiable.

8. A method according to claim 7, wherein the check parameter is stored in the card or in a computer.

9. A method according to claim 8, wherein in a check selection station preceding the readout station the identity of the client and the associated check parameter is determined by means of the customer pass and subsequently it is automatically determined whether a check should be carried out; and if a check is to be carried out, the client is guided to a check cash desk, where the articles selected by the client are registered once again by a storeworker, the result of that registration being fed to the readout station to which the check cash desk is coupled.

10. A store arrangement for practicing the method according to claim 1, comprising a readout station for reading out the articles registered with a scanner; a device for recognizing a customer pass and means for automatically determining an associated check parameter, whilst further an automatically operating device is provided, which, depending on the check parameter determined, generates a signal indicating whether a check should take place.

11. A store arrangement according to claim 10, wherein the check parameter is an integer; the automatically operating device, depending on the check parameter determined, generates a random integer not greater than the check parameter and produces a check signal if the random integer is equal to a predetermined number.

12. A store arrangement according to claim 11, comprising a dispensing station for portable scanners, this dispensing station comprising an automatic identification device for identifying a customer pass that is being presented, and this dispensing station releasing a scanner after recognition of a customer pass.

13. A store arrangement according to claim 12, wherein the readout station is adapted to produce a receipt.

14. A store arrangement according to claim 12, comprising a check selection station which, through the customer pass, determines the identity of the client and the associated check parameter and which, starting from the check parameter, determines automatically whether a check should take place; and which, in case a check is to take place, guides the client to a check cash desk.

15. A store arrangement according to claim 14, wherein the check selection station, depending on whether or not a check should take place, clears a passage to a check cash desk or the readout station.

16. A store arrangement according to claim 15, wherein the check cash desk is adapted for the conventional registration of articles but passes the result of that registration directly to the readout station.

17. A store arrangement according to claim 16, wherein the readout station is adapted to identify a customer pass.

18. A store arrangement according to claim 17, wherein the automatically operating device comprises a random generator.

19. A store arrangement according to claim 18, wherein the automatically operating device is a computer.

20. A store arrangement according to claim 19, wherein the computer is part of the readout station.

21. A method for checking articles selected by a store client and with respect to which certain article information on the articles is registered in a scanner by a client in a self-service store, wherein a customer pass is issued to each client who will make use of a self-registration system in selecting articles in the store and registering the article information regarding the articles, each customer pass including first client information identifying the client to whom the customer pass is issued, the registration system including information processing equipment for processing the first client information contained on said customer pass and the article information registered in the scanner, and one of the processing equipment and the customer pass including a check parameter, the parameter including second client information relating to whether the client's use of the self-registration system is to be checked for accuracy after the client has registered the selected articles in the scanner; the method comprising:
a) coupling the scanner to the processing equipment;
b) reading the article information regarding the articles as registered in the scanner by means of the processing equipment;
c) coupling the customer pass to the processing equipment;
d) determining the identity of the client and the client's check parameter by means of the processing equipment;
e) determining, by means of the processing equipment and the check parameter, whether a check should take place of the accuracy of the use of the self-registration system by the client; and
f) carrying out a check if it is determined by means of the processing equipment that a check is to take place.

22. The method according to claim 21, wherein:

a) the check parameter is an integer; and
b) the step of determining whether a check should take place includes the steps of:
1) generating, by means of the processing equipment, a first random integer;
2) comparing, by means of the processing equipment, the random integer to a second integer; and
3) carrying out a check if the generated random integer is related to the second integer in a predetermined way.

23. The method according to claim 22, wherein:
a) the check parameter is a third integer;
b) the random integer is no greater than the third integer;
c) the second integer is a predetermined integer no greater than the third integer; and
d) a check is carried out if the generated random integer is equal to the predetermined integer.

24. The method according to claim 23, wherein;
a) the check is carried out by a cash desk storeworker, who registers the article information of the selected articles independently of the article information in the scanner; said method further comprising:
b) comparing the article information registered by the storeworker with the article information registered in a readout unit by way of the scanner, without the comparison becoming observable by the cash desk storeworkers; and
c) producing one single receipt for the selected articles based on the article information registered by the storeworker.

25. The method according to claim 24, including the step of changing the check parameter depending on the result of the comparison of one or more checks.

26. A method according to claim 23, including the step of supplying a scanner to a client after the client has been identified by processing said first client information on said customer pass by means of said processing equipment.

27. The method according to claim 26, including the step of storing the check parameter in said customer pass.

28. The method according to claim 26, including the step of storing the check parameter in said processing equipment.

29. The method according to claim 21, wherein the processing equipment includes a check selection station for determining whether said check should take place, a readout station for coupling said scanner to said processing equipment and a check cash desk for carrying out said check by said cash desk storeworker, said method further including:
a) first directing the client to the check selection station for determining whether a check is to be made;
b) subsequently directing the client via a first route to the readout station if no check is to be made and via a second route to the check cash desk if a check is to be made;
c) carrying out a check at the check cash desk for the client directed along said second route;
d) supplying the article information determined at the check cash desk to the readout station;
e) directing the client to the readout station via a continuation of said second route after a check is made at the check cash desk;

f) coupling the scanner to the processing equipment when the client reaches the readout station via either said first or second route; and g) issuing a receipt for payment at said readout station based on article information in said scanner when said client takes said first route and issuing said receipt on article information determined by said check when said client takes said second route.

30. A self-service article selection and registration system for checking articles selected by a store client and with respect to which certain article information on the articles is registered in a scanner by the client, the system comprising:

a) a customer pass for each client who is to use the system, each customer pass including first client information identifying the client to whom the customer pass is issued;

b) information processing means for processing the first client information contained on said customer pass to identify the client;

c) a check parameter for each client stored in one of said customer pass and the processing means, said parameter including second client information relating to whether the client's use of the system is to be checked for accuracy after the client has registered the selected articles in the scanner;

d) a readout means for coupling the scanner to the information processing means to read the article information regarding the articles as registered in the scanner and issue a receipt for payment based on said article information; and e) a check selection means for coupling the customer pass to the information processing means to determine the identity of the client and for analyzing the check parameter of the client to determine and generate a signal specifying whether a check should take place of the accuracy of the use of the system by the client.

31. The system according to claim 30, wherein:

a) the processing means is constructed to analyze said check parameter by generating a first random integer and comparing the random integer with a second integer stored in the processing means to determine whether or not the random integer is related to the second integer and said check parameter in a predetermined way indicating that a check is to be made.

32. The system according to claim 31, wherein:

a) the check parameter is a third integer;

b) the random integer is no greater than the third integer;

c) the second integer is a predetermined integer no greater than the third integer; and d) the random integer is related to the second integer in said predetermined way when equal to the second integer.

33. The system according to claim 32, further comprising:

a) a scanner dispensing means for dispensing a scanner to a client upon the identity of the client being determined by the information processing means processing the first client information contained on said customer pass.

34. The system according to claim 33, further comprising:

a) a check cash desk for carrying out said check by a cash desk storeworker when said check selection means determines that a check is to be made, said check including checking the article information relating to the articles selected by the client independently of the article information in said scanner;

b) said check selection means includes a check selection station located before said check cash desk; and c) guide means for directing the client from said check selection means to said check cash desk when a check is to be made and to said readout means when a check is not to be made.

35. The system according to claim 34, wherein:

a) the check cash desk is coupled to said readout means for transferring the article information checked at the check cash desk to said readout means for issuing a receipt for payment based on the transferred article information.

* * * * *